Patented Aug. 11, 1925.

1,549,552

UNITED STATES PATENT OFFICE.

CLAUDE H. HUNSAKER, OF ST. LOUIS, MISSOURI.

PROCESS OF MAKING CEMENTITIOUS PRODUCTS.

No Drawing. Application filed May 11, 1925. Serial No. 29,642.

*To all whom it may concern:*

Be it known that I, CLAUDE H. HUNSAKER, a citizen of the United States, residing at St. Louis, in the State of Missouri, have invented certain new and useful Improvements in Processes of Making Cementitious Products, of which the following is a specification.

This invention relates to the manufacture of concrete or cementitious agglomerates substances such as blocks, beams and slabs employed in the construction of buildings; columns, foundations, steps and the like or other forms or shapes into which concrete or cementitious substances are made.

The invention relates more particularly to a process for the treatment of the base or primary elements, such as cinders, ashes, clinkers, slag, mine chats, such as lead and zinc, or other substances used in the aggregate mixtures in manufacturing such articles, which process aims to remove or neutralize the injurious acids, alkalis or other substances usually present in the base and in such quantities as to have an injurious effect upon the cement used to bond the mass together.

It is very economical and desirable to use comparatively light substances such as ashes, cinders, clinkers and the like in the manufacture of building blocks, steps, columns, foundations and the like because of the resultant lighter weights not only in the process of manufacture, but also in freighting, handling and erection or placement of the finished articles.

There is likewise a further advantage incident to the comparative porousness or lesser densities of the mass of the manufactured articles where base aggregates of this character are used, due in part to the ease with which nails, screws and the like penetrate the articles so made and commonly used in securing the blocks, slabs and the like in secure relation to each other and to the other materials, such as boards, studdings, joists and timbers or expanded metals commonly used in the fabrication of buildings and structures. Cement mortar will also penetrate the surface pores of such articles and will more readily bond them in fixed relation to each other.

The desirability of using ashes, cinders, clinkers and the like in the manufacture of such articles has been long recognized in the art, but due to the almost ever present and varying quantities of acids, and at times alkalies, in such amounts as to have a deleterious and harmful effect upon the cement used in the manufacture of articles in which such substances are used as aggregates, such use has not been commercially acceptable.

This injurious action of these present substances which attack the cement, is more pronounced when the articles themselves are exposed to the elements, as in the outer walls of buildings, and underground where moisture and seepages from sewers and the like come into contact with the concrete or cementitious articles. It is well known that certain acids in sewage, pipes and conduits, and seepage of like substances, unite with certain acids in the aggregate and produce very harmful and injurious results, notably disintegration.

I have found in the practice of my invention that injurious or harmful quantities of acids or sulphur are usually present in cinders, ashes, clinkers and the like residuum resultant from the combustion of coal and other bituminous substances, but that the quantity and identity of such acids varies where different bituminous products are burned, and even vary with the same product where the combustion occurs in different furnaces or under other varying conditions.

I have also found injurious quantities of acids, sulphur and alkalies present in lead mine and other chats, which destroy their value as a base in cementitious usage.

I am aware that efforts have been made heretofore, to reduce the injurious and harmful quantities of acids, or alkalies present in cinders, ashes, clinkers, chats and the like by washing with water. Efforts along this line, however, have been of no practical value or benefit because at most such method of treatment could only dilute or remove a part of the free acids or alkalies from the outer surfaces of the particles of the cinders, clinkers, and the like, while the very nature of the acids and alkalies acting upon the substances in which found, causes such acids, aciduous or alkaline solutions to thoroughly penetrate or impregnate the particles of such ashes, cinders, clinkers, chats and the like in their entirety. Moreover, the action of the intense heat of combustion cooperates with acids in driving them into all parts of the mass of cinders, ashes or clinkers and into each and every particle thereof, where such acids are at all present. It is, therefore, evident that treatments by washing with water are of little or no practical value, since superficial removal only is thereby possible.

By the practice of my invention all these conditions are overcome and the injurious elements are completely removed or neutralized, as will readily appear from the following description:

I first take samples of the ashes, cinders, slag, chats, clinkers or other substances desired to be used in the manufacture of concrete or cementitious articles and by chemical analysis determine what acid or acids, alkali or alkaline sulphur or other injurious substance is present therein, and in what combinations and quantities. I then determine the quantity of and the proper neutralizing agent required for a given quantity of the substance to be treated, to completely neutralize and overcome the objectionable and injurious action of the substance present therein.

It will be understood that the neutralizing agent must be one of sufficient qualities, quantity and active powers, that when brought into contact and thoroughly intermixed with the mass to be acted upon, to thoroughly and completely penetrate each of the particles of the mass treated and combine with or attack and neutralize the injurious substance in all the inter-molecular spaces of each and every particle thereof.

As an example of the practice of my invention, by analysis or other suitable method it is found that the resultant cinder or clinker from the combustion of a certain coal contains sulphurous or sulphuric acids. The amount or extent of such acidity is then determined, and a neutralizing agent, such as sodium carbonate, sodium hydroxide or potassium hydroxide in the proper quantity to neutralize such determined acidity, is brought into contact with the mass to be treated. If on the other hand the aggregate base is found to have an alkaline condition, then any well known acid, such as sulphuric acid can be employed to correct such condition.

It may be found in instances where two or more distinct acids or other injurious substances are present in any given mass, that more than one treatment of the same neutralizing agent, or separate treatments of different neutralizing agents are required, the present invention residing in the removal of any content, determined by analysis both as to character and quantity whether acid or alkali, or otherwise, which is deleterious to cement in the manufactured cementitious products of all characters.

The term "aggregate base" as employed is intended to comprehend any base, whether cinders, ashes, clinkers, slag, mine chats, etc.

What I claim is:

1. The herein described process of making cementitious products, which consists in initially taking an aggregate base and chemically analyzing same to determine the presence of acid or alkali elements injurious to cement both as to the nature and quantity of such elements, then in chemically treating the base to neutralize such elements, then in combining the base with cement and water to form a plastic composition and finally moulding such composition.

2. The herein described process of making cementitious products, which consists in initially taking an aggregate base composed of cinders and chemically analyzing same to determine the presence of acid or alkali elements injurious to cement both as to the nature and quantity of such elements, then in chemically treating the base to neutralize such elements, then in combining the base with cement and water to form a plastic composition and finally moulding such composition.

In testimony whereof I affix my signature.

CLAUDE H. HUNSAKER.